(12) United States Patent
Lee et al.

(10) Patent No.: US 8,463,210 B2
(45) Date of Patent: Jun. 11, 2013

(54) APPARATUS AND METHOD FOR TRANSMITTING A REFERENCE SIGNAL IN A RADIO COMMUNICATION SYSTEM

(75) Inventors: Moon Il Lee, Anyang-si (KR); Jae Hoon Chung, Anyang-si (KR); Hyun Soo Ko, Anyang-si (KR); Bin Chul Ihm, Anyang-si (KR)

(73) Assignee: LG Electronics Inc., Seoul (KR)

( * ) Notice: Subject to any disclaimer, the term of this patent is extended or adjusted under 35 U.S.C. 154(b) by 85 days.

(21) Appl. No.: 13/146,906

(22) PCT Filed: Jan. 29, 2010

(86) PCT No.: PCT/KR2010/000549
§ 371 (c)(1),
(2), (4) Date: Jul. 28, 2011

(87) PCT Pub. No.: WO2010/087644
PCT Pub. Date: Aug. 5, 2010

(65) Prior Publication Data
US 2011/0281536 A1    Nov. 17, 2011

Related U.S. Application Data

(60) Provisional application No. 61/169,712, filed on Apr. 15, 2009, provisional application No. 61/163,033, filed on Mar. 24, 2009, provisional application No. 61/148,399, filed on Jan. 30, 2009.

(30) Foreign Application Priority Data

Jan. 28, 2010    (KR) .................... 10-2010-0008124

(51) Int. Cl.
*H04B 1/04*    (2006.01)

(52) U.S. Cl.
USPC ........ 455/129; 155/506; 155/562.1; 155/101; 155/102; 370/328; 370/334; 370/338

(58) Field of Classification Search
USPC ............. 455/506, 562.1, 91, 101, 102, 114.1, 455/115.1, 121, 129; 370/328, 334, 338
See application file for complete search history.

(56) References Cited

U.S. PATENT DOCUMENTS

2008/0192856 A1*    8/2008    Jongren et al. ................ 375/267

FOREIGN PATENT DOCUMENTS

| JP | 2008109670 | 5/2008 |
|----|------------|--------|
| JP | 2008236429 | 10/2008 |

(Continued)

OTHER PUBLICATIONS

Nortel, "Design Aspect for Higher-order MIMO in LTE-advanced," R1-090144, 3GPP TSG-RAN Working Group 1 Meeting #55b, Jan. 2009, 8 pages.
QUALCOMM Europe, "Precoding Structure for DL MIMO," R1-062700, 3GPP TSG-RAN WG1 #46bis, Oct. 2006, 7 pages.
LG Electronics, "Downlink Reference Signal for Higher Order MIMO," R1-090218, 3GPP TSG RAN WG1 Meeting #55bis, Jan. 2009, 7 pages.

(Continued)

*Primary Examiner* — Tuan Pham
(74) *Attorney, Agent, or Firm* — Lee, Hong, Degerman, Kang & Waimey

(57) ABSTRACT

An apparatus and a method for transmitting a reference signal in a radio communication system are provided. The apparatus comprises: N antennas; and a processor which is connected to the N antennas and which generates K (wherein K<N) reference signal sequence vectors based on K reference signal sequences and K virtual antenna vectors, and which transmits the K reference signal sequence vectors via the N antennas.

8 Claims, 15 Drawing Sheets

FOREIGN PATENT DOCUMENTS

| | | |
|---|---|---|
| KR | 10-2004-0078604 | 9/2004 |
| KR | 10-2006-0004786 | 1/2006 |
| KR | 10-2007-0031422 | 3/2007 |
| KR | 10-2007-0046976 | 5/2007 |
| WO | 2008058112 | 5/2008 |
| WO | 2008061045 | 5/2008 |
| WO | 2008100214 | 8/2008 |

OTHER PUBLICATIONS

LG Electronics, "Consideration on DL-MIMO in LTE-Advanced," R1-083654, 3GPP TSG RAN WG1 Meeting #54bis, Sep. 2008, 3 pages.

Japan Patent Office Application Serial No. 2011-547799, Office Action dated Feb. 26, 2013, 3 pages.

\* cited by examiner

Antenna #5

APPARATUS AND METHOD FOR TRANSMITTING A REFERENCE SIGNAL IN A RADIO COMMUNICATION SYSTEM

CROSS-REFERENCE TO RELATED APPLICATIONS

This application is a 371 U.S. national stage application of International Application No. PCT/KR2010/000549, filed on Jan. 29, 2010, which claims the benefit of earlier filing date and right of priority to Korean Patent Application No. 10-2010-0008124, filed on Jan. 28, 2010 and also claims the benefit of U.S. Provisional Application Ser. Nos. 61/169,712, filed on Apr. 15, 2009, 61/163,033, filed on Mar. 24, 2009 and 61/148,399, filed on Jan. 30, 2009, the contents of which are all incorporated by reference herein in their entirety.

TECHNICAL FIELD

The present invention relates to wireless communication, and more particularly, to an apparatus and a method for transmitting reference signals in a wireless communication system.

BACKGROUND ART

A wireless communication system has been prevalently developed so as to provide various types of communication services, such as audio, data, or the like. A goal of the wireless communication system is to enable multiple users to execute reliable communication regardless of location and mobility. However, a wireless channel has abnormal characteristics, such as a fading phenomenon due to path loss, noise, or multipath, a Doppler effect due to intersymbol interference (ISI) or mobility of a user equipment, or the like. Therefore, various technologies to overcome the abnormal characteristics of the wireless channel and increase the reliability of the wireless communication have been developed.

As a technology for supporting reliable high-speed data services, there is multiple input multiple output (MIMO). The MIMO scheme improves the transmit and receive efficiency of data by using a multiple transmit antenna and a multiple receive antenna. An example of the MIMO scheme may include spatial multiplexing, transmit diversity, beam forming, or the like.

A MIMO channel matrix is generated by the multiple receive antenna and the multiple transmit antenna. A rank may be obtained from the MIMO channel matrix. The rank is the number of spatial layers. The rank may be defined as the number of spatial streams that may be simultaneously transmitted by a transmitter. The rank is referred to as a spatial multiplexing rate. When the number of transmit antennas is Nt and the number of receive antennas is Nr, the rank R becomes $R \leq \min\{Nt, Nr\}$.

In the wireless communication system, signals known to both of the transmitter and the receiver are needed for channel measurement, information demodulation, or the like. The signals known to both of the transmitter and the receiver are referred to as a reference signal (RS). The RS may be referred to as a pilot.

The receiver may estimate a channel between the transmitter and the receiver using the RS and demodulate information using the estimated channel. When the user equipment receives the RS from a base station, the user equipment may measure a channel using the RS and feedback channel state information to the base station. Since the signals transmitted from the transmitter use the corresponding channels for each transmit antenna or each spatial layer, the RS may be transmitted for each transmit antenna or each spatial layer.

Meanwhile, in the International Telecommunication Union (ITU), an international mobile telecommunication-advanced (IMT-A) system has been standardized as a next generation mobile communication system after the third generation. A goal of the IMT-A system is to provide a high transmission rate that is a 1 gigabits per second (Gbps) downlink and 500 megabits per second (Mbps) uplink while supporting internet protocol (IP) based multimedia seamless services. In the 3rd generation partnership project (3GPP), a long term evolution-advanced (LTE-A_) system is considered as a candidate technology for the IMT-A system.

Although the LTE system is required to support up to four transmit antennas for downlink transmission, the LTE-A system is required to support up to eight transmit antennas for the time of the downlink transmission. However, the user equipment (hereinafter, LTE user equipment) to which the LTE system is only applied and the user equipment (hereinafter, LTE-A user equipment) to which the LTE-A system is applied may coexist in a cell. The LTE-A system is designed to support the LTE user equipment and the LTE-A user equipment together. However, when supporting the transmission through different numbers of antennas, a problem in an apparatus and method for transmitting RS is caused. Therefore, There is a need for an apparatus and method for efficiently transmitting RS in the wireless communication system.

DISCLOSURE

Technical Problem

The present invention provides an apparatus and a method for transmitting a reference signal in a wireless communication system.

Technical Solution

In an aspect, an apparatus for transmitting a reference signal is provided. The apparatus includes N antennas, and a processor operatively coupled with the N antennas and configured to generate K reference signal sequence vectors based on K reference signal sequences and K virtual antenna vectors, where K<N, and transmit the K reference signal sequence vectors through the N antennas.

In another aspect, a method for transmitting a reference signal in a wireless communication system is provided. The method includes generating K reference signal sequence vectors based on K reference signal sequences and K virtual antenna vectors, where K<N, and transmitting the K reference signal sequence vectors through N antennas.

Advantageous Effects

The apparatus and the method for efficiently transmitting reference signals in a wireless communication system are provided. Therefore, the overall system performance can be improved.

MODE FOR INVENTION

The following technologies may be used for various multiple access schemes, such as code division multiple access (CDMA), frequency division multiple access (FDMA), time division multiple access (TDMA) system, orthogonal frequency division multiple access (OFDMA), single carrier frequency division multiple access (SC-FDMA), or the like. The CDMA may be implemented by radio technologies such as universal terrestrial radio access (UTRA) or CDMA 2000. The TDMA may be implemented by radio technologies, such as global system for mobile communications (GSM)/general packet radio service (GPRS)/enhanced data rates for GSM evolution (EDGE). The OFDMA may be implemented by radio technologies, such as Institute of Electrical and Electronics Engineers (IEEE) 802.11 (Wi-Fi), IEEE 802.16 (WiMAX), IEEE 802.20, evolved-UTRA (E-UTRA), or the like. The UTRA is a part of Universal Mobile Telecommunications System (UMTS). The 3rd Generation Partnership Project (3GPP) long term evolution (LTE), which is a part of Evolved UMTS (E-UMTS) using the E-UTRA, adopts the OFDMA at downlink and adopts the SC-FDMA at uplink. The LTE-A (Advanced) is evolved from the LTE.

For clear description, exemplary embodiments of the present invention mainly describe the LTE (Release 8)/LTE-A (Release 10), but the technical idea of the present invention is not limited thereto.

Figure 1:
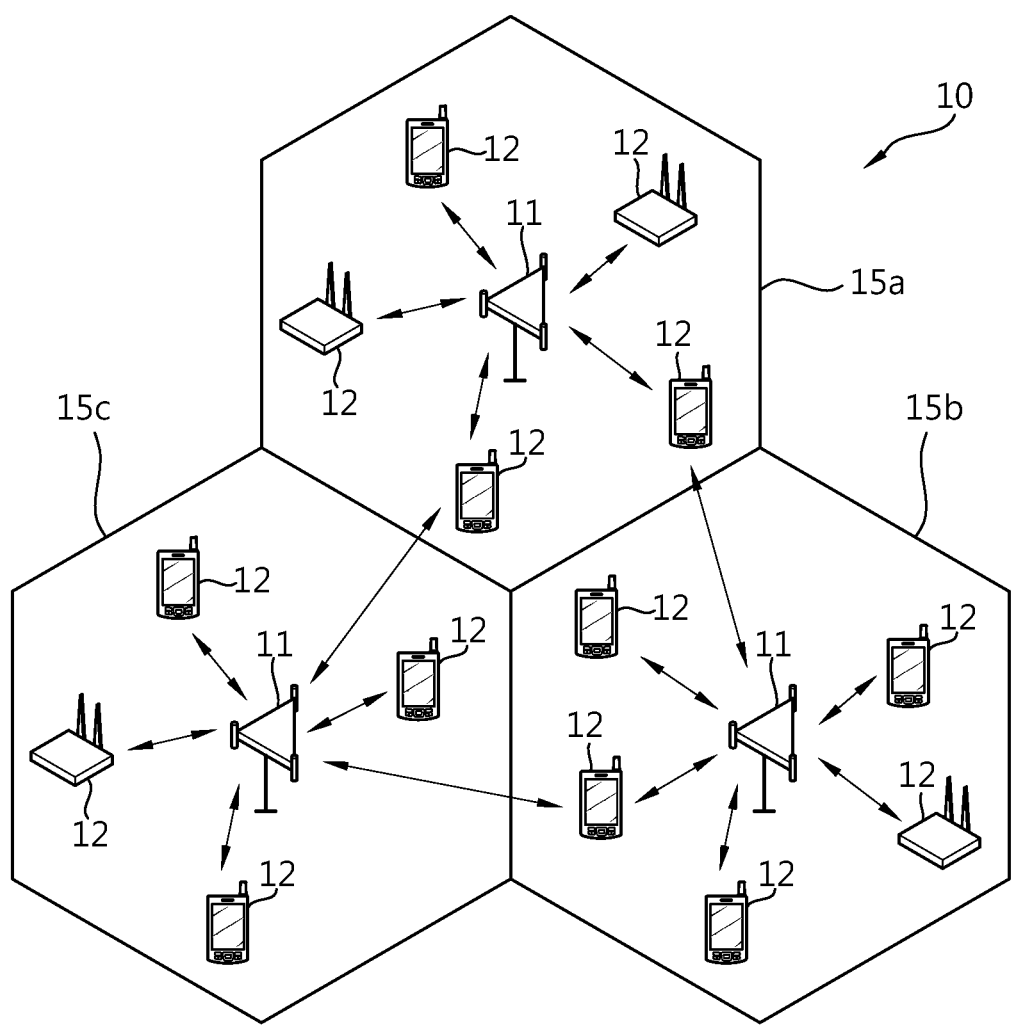
FIG. 1 is a block diagram showing a wireless communication system.

FIG. 1 shows a block diagram of a wireless communication system.

Referring to FIG. 1, a wireless communication system 10 includes at least one base station (BS) 11. Each BS 11 provides communication services to specific geographical areas (generally, referred to as a cell) 15*a*, 15*b*, and 15*c*. The cells may be again divided into a plurality of areas (referred to as a sector). A user equipment (UE) 12 may be fixed or have mobility and may be referred to as other terms, such as a mobile station (MS), a user terminal (UT), a subscriber station (SS), wireless devices, personal digital assistants (PDAs), a wireless modem, handheld devices, or the like. The BS 11 is generally referred to as a fixed station that communicates with the UE 12 and may be referred to as other terms, such as evolved-Node B (eNB), a base transceiver system (BTS), an access point, or the like.

Hereinafter, downlink (DL) means communication from the BS to the UE and uplink (UL) means communication from the UE to the BS. In the downlink, a transmitter may be a part of the BS and a receiver may be a part of the UE. In the uplink, the transmitter may be a part of the UE and the receiver may be a part of the BS.

The wireless communication system may support a multiple antenna. The transmitter uses a plurality of transmit antennas and the receiver may use a plurality receive antennas. The transmit antenna means a physical or logical antenna used to transmit a single signal or stream and the receive antenna means a physical or logical antenna used to receive the single signal or stream. When the transmitter and the receiver use a plurality of antennas, the wireless communication system may be referred to as a multiple input multiple output (MIMO) system.

It is more preferable that a process of wireless communication is implemented by a plurality of vertical independent layers than being implemented by a single layer. A structure of the plurality of vertical layers is referred to as a protocol stack. The protocol stack may refer to an open system interconnection (OSI) model that is a model for a protocol structure widely known in the communication system.

Figure 2:
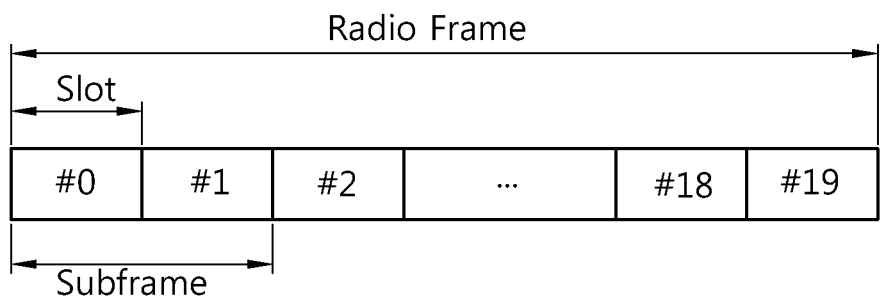
FIG. 2 is a diagram of an example of a radio frame structure.

FIG. 2 shows an example of a radio frame structure.

Referring to FIG. 2, a radio frame includes 10 subframes and one subframe includes two slots. The slots within the radio frame are numbered from #0 to #19. The time for transmitting a single subframe is referred to as a transmission time interval (TTI). The TTI may be referred to as a scheduling unit to transmit information. For example, a length of a single radio frame may be 10 ms, a length of the single subframe may be 1 ms, and a length of the single slot may be 0.5 ms. The structure of the radio frame is only an example and the number of subframes included in the radio frame or the number of slots included in the subframe may be variously changed.

Figure 3:
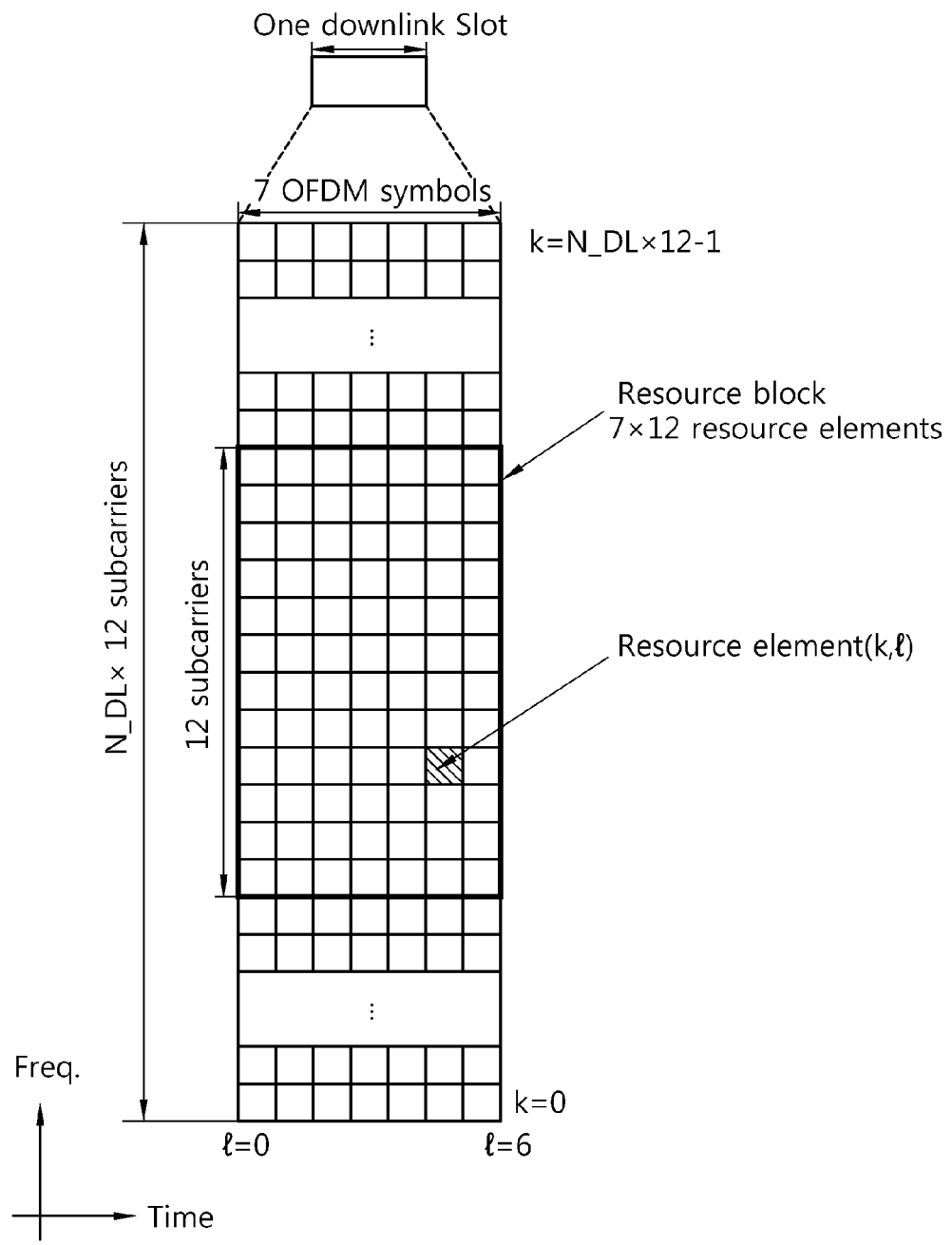
FIG. 3 is a diagram showing a resource grid for a single downlink slot.

FIG. 3 shows an exemplified diagram of a resource grid for a single downlink slot.

Referring to FIG. 3, a downlink slot includes a plurality of orthogonal frequency division multiplexing (OFDM) symbols in time domain and includes an N_DL resource block (RB) in frequency domain. The OFDM symbol, which is to represent one symbol duration, may be called other names, such as an OFDM symbol, an SC-FDMA symbol, or the like, according to a multiple access scheme. The number of resource blocks N_DL included in the downlink slot depends on a downlink transmission bandwidth set in the cell. In the LTE, the N_DL may be any one of 60 to 110. A resource block includes a plurality of subcarriers in the frequency domain.

Each element on the resource grid may be referred to as a resource element. The resource element on the resource grid may be identified by an index pair (k, f) within the slot. In this case, k (k=0, . . . , N_DL×12−1) is a subcarrier index within the frequency domain and l(l=0, . . . , 6) is an OFDM symbol index within the time domain.

In this case, the resource block exemplarily describes that the single resource block includes 7×12 resource elements including 7 OFDM symbols in the time domain and 12 subcarriers in the frequency domain, but the number of OFDM symbols and the number of subcarriers within the resource block is not limited thereto. The number of OFDM symbols may be variously changed according to a length of a cyclic prefix (CP) and subcarrier spacing. For example, in the case of a normal CP, the number of OFDM symbols is 7 and in the case of an extended CP, the number of OFDM symbols is 6.

The resource grid for the single downlink slot of FIG. 3 may be applied to the resource grid for the uplink slot.

Figure 4:
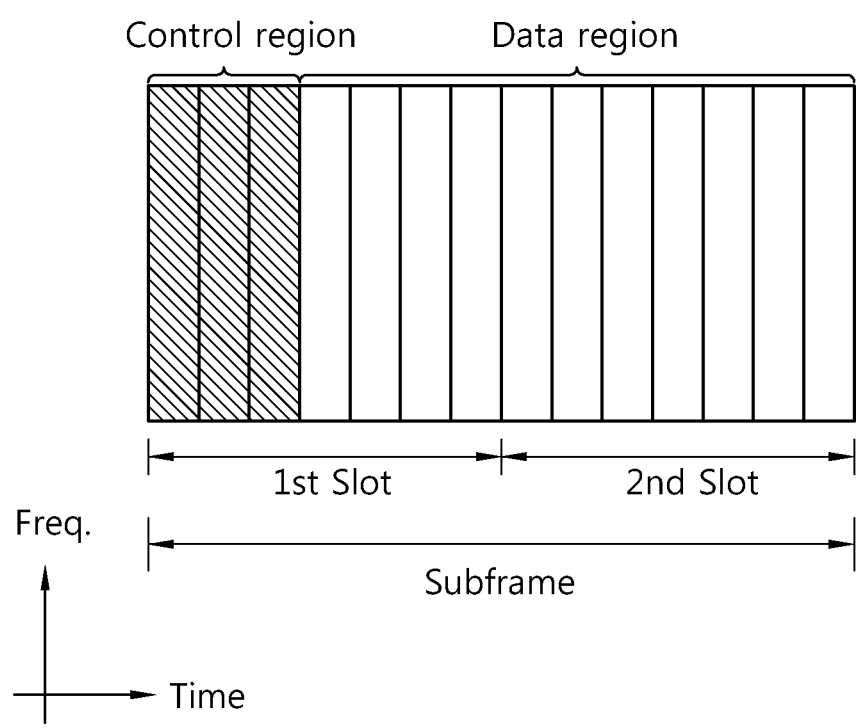
FIG. 4 is a diagram showing an example of a structure of a downlink subframe.

FIG. 4 shows an example of a structure of a downlink subframe.

Referring to FIG. 4, a downlink subframe includes two consecutive slots. Preceding 3 OFDM symbols of a first slot within the downlink subframe is in a control region and the remaining OFDM symbols are in a data region. In this case, the case where the control region includes 3 OFDM symbols is only an example.

A physical downlink shared channel (PDSCH) may be allocated to the data region. The downlink data are transmitted on the PDSCH.

A control channel, such as a physical control format indicator channel (PCFICH), a physical hybrid automatic repeat request (HARQ) indicator channel (PHICH), a physical downlink control channel (PDCCH), or the like, may be allocated to the control region.

The PCFICH carries information regarding the number of OFDM symbols used to transmit the PDCCHs to the UE within the subframe. The number of OFDM symbols used to transmit the PDCCH may be changed at each subframe. The PHICH carries HARQ ACK (acknowledgement)/NACK (negative acknowledgement) for the uplink data.

The PDCCH carries the downlink control information. An example of the downlink control information may include downlink scheduling information, uplink scheduling information, uplink power control instructions, or the like. The downlink scheduling information is referred to as a downlink grant and the uplink scheduling information is referred to as an uplink grant.

The downlink grant may include a resource allocation field indicating a time-frequency resource transmitted by the downlink data, an MSC field indicating a modulating coding scheme (MSC) level of the downlink data, or the like.

In a wireless communication system, signals known to both of the transmitter and the receiver are needed for channel measurement, information demodulation, or the like, The signals known to both of the transmitter and the receiver are referred to as a reference signal (RS). The reference signal may also be referred to as a pilot. The reference signal may be generated in a physical layer without carrying information derived from a higher layer.

The reference signals that are multiplied by predetermined reference signal sequences may be transmitted. The reference signal sequence may be a binary sequence or a complex sequence. For example, the reference signal sequence may use a pseudo-random (PN) sequence, an m-sequence, or the like. However, this is only example and the reference signal sequences are not particularly limited. When the BS transmits the reference signals that are multiplied by the reference signal sequences, the UE may reduce interference by which signals of adjacent cells affect the reference signals. Thereby, the channel estimation performance may be improved.

The reference signal may be classified into a common reference signal (RS) and a dedicated reference signal (RS).

The common reference signals are the reference signals transmitted to all the UEs within the cell. All the UEs within the cell may receive the common reference signals. In order to avoid the inter-cell interference, the common reference signals may be defined according to the cell. In this case, the common reference signal is referred to as a cell-specific reference signal. The common reference signal may be used for the channel measurement and the information demodulation. An example of the reference signal for only channel measurement may include a channel state information-RS (CSI-RS).

The dedicated reference signal is a reference signal that is received by the specific UE within the cell or a specific UE group. Other UEs may not use the dedicated reference signals. The dedicated reference signal is referred to as a UE-specific reference signal (UE-specific RS). The dedicated reference signals may be transmitted through the resource block allocated to transmit the downlink data of the specific UE. The dedicated reference signals may be used for the information demodulation.

Figure 5:
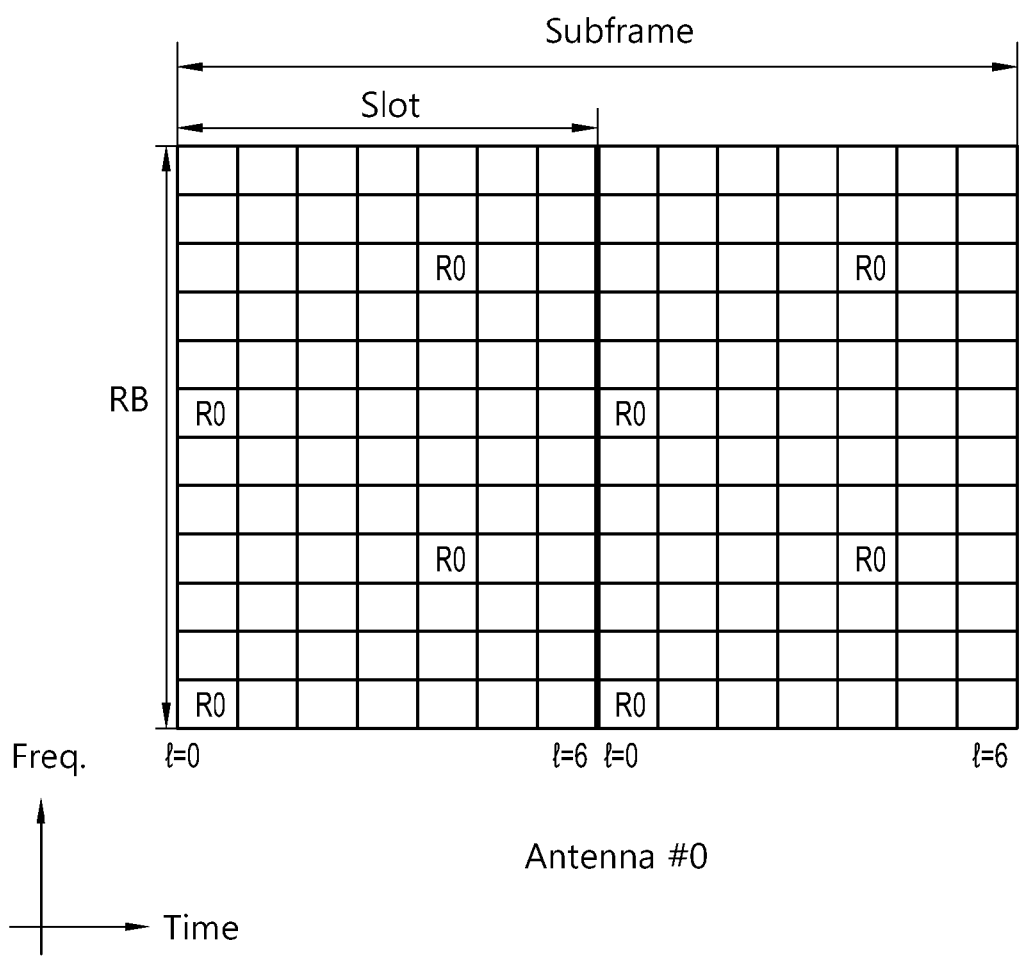
FIG. 5 is a diagram showing an example of mapping of a common reference signal for a single antenna in the case of a normal CP.
Figure 6:
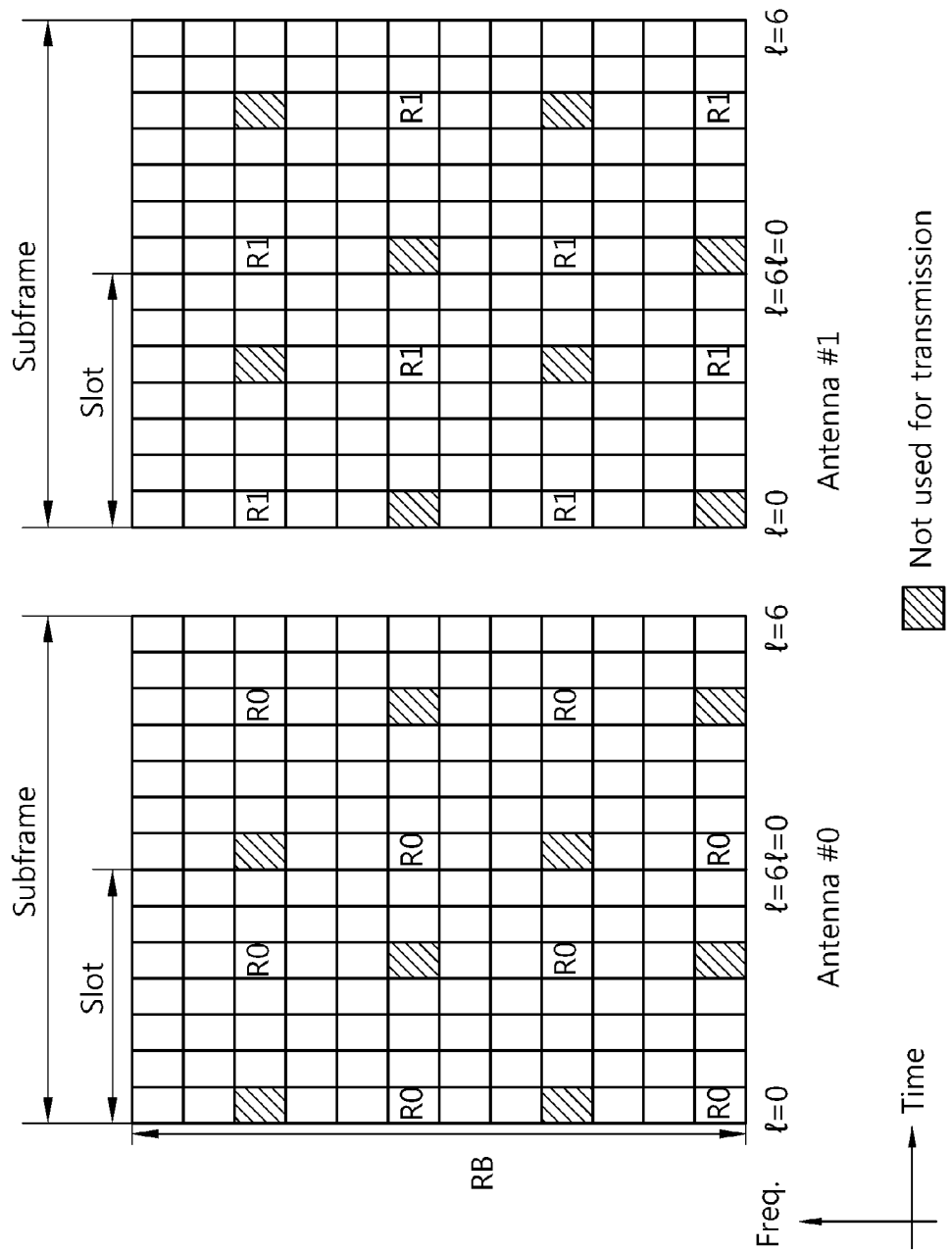
FIG. 6 is a diagram showing an example of mapping of common reference signals for two antennas in the case of the normal CP.
Figure 7:
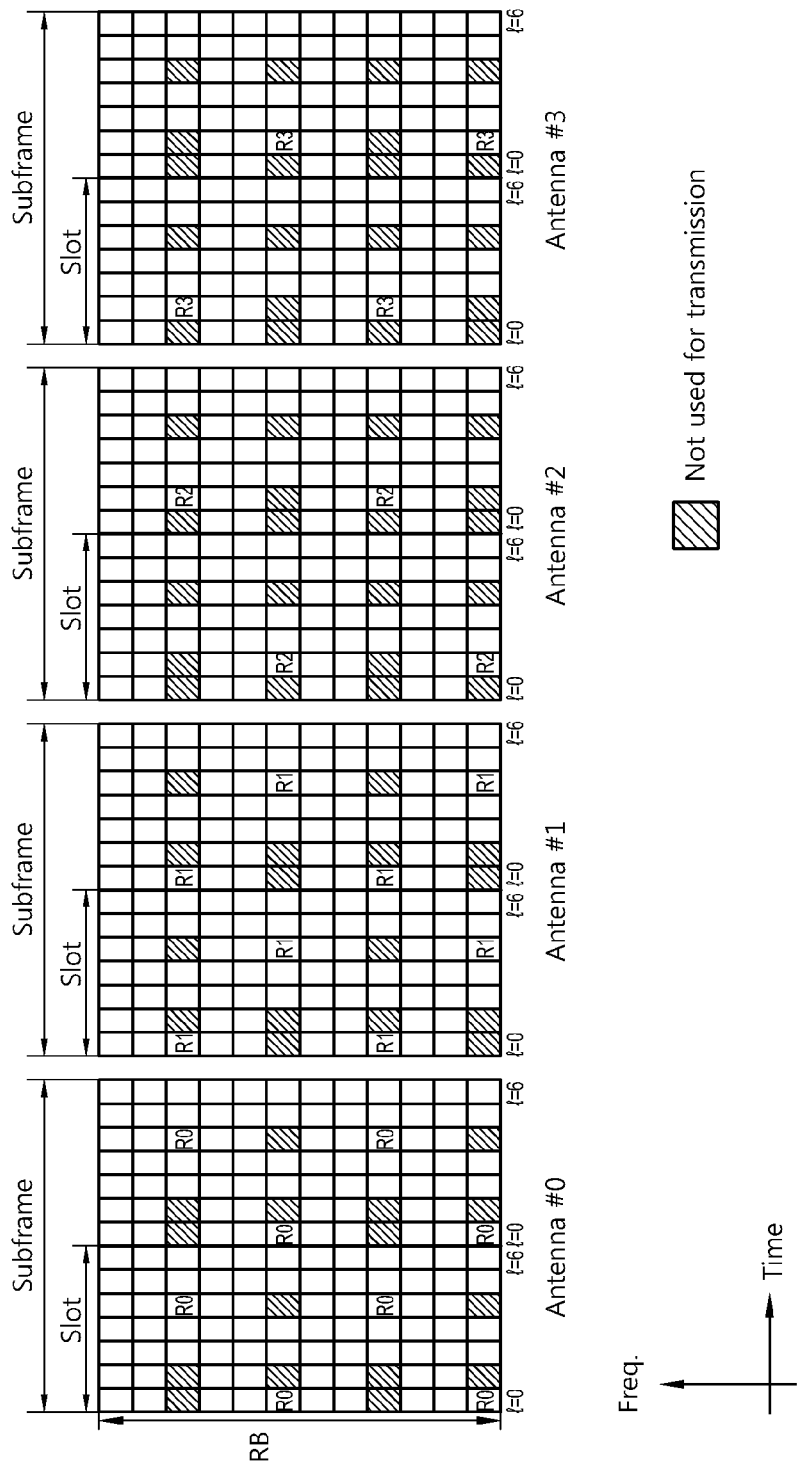
FIG. 7 is a diagram showing an example of mapping of common reference signals for four antennas in the case of the normal CP.
Figure 8:
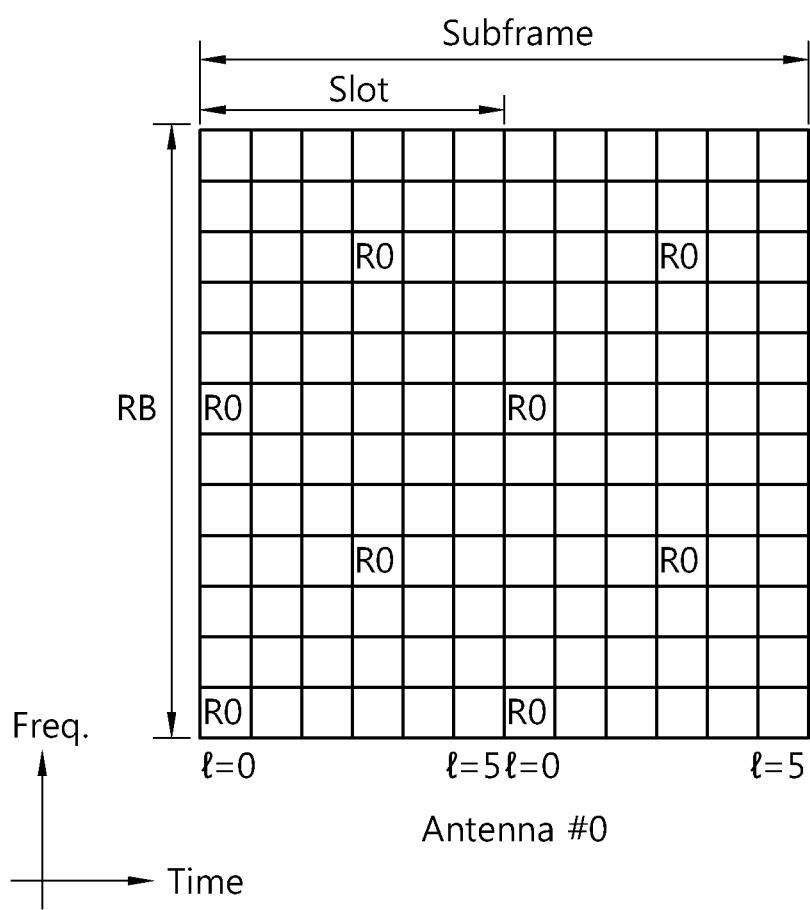
FIG. 8 is a diagram showing an example of mapping of a common reference signal for a single antenna in the case of an extended CP.
Figure 9:
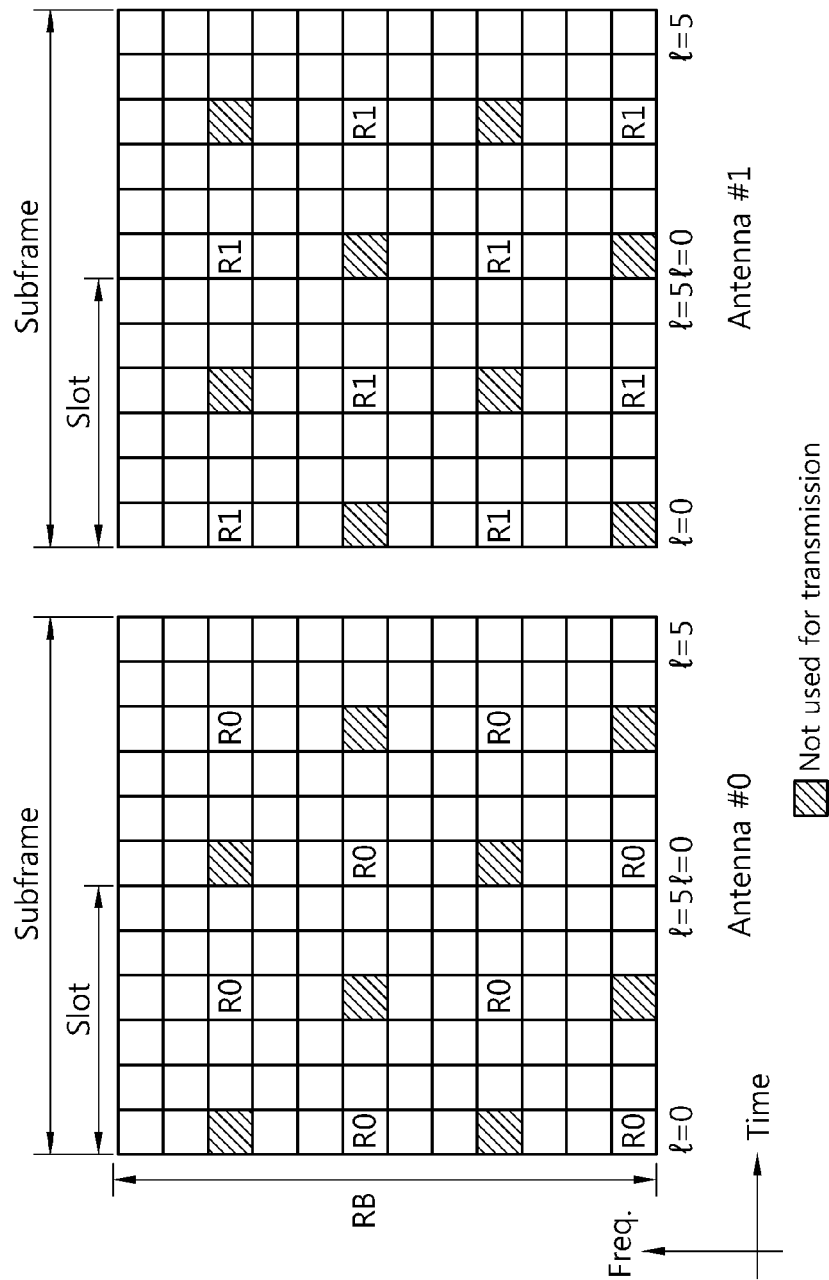
FIG. 9 is a diagram showing an example of mapping of common reference signals for two antennas in the case of the extended CP.
Figure 10:
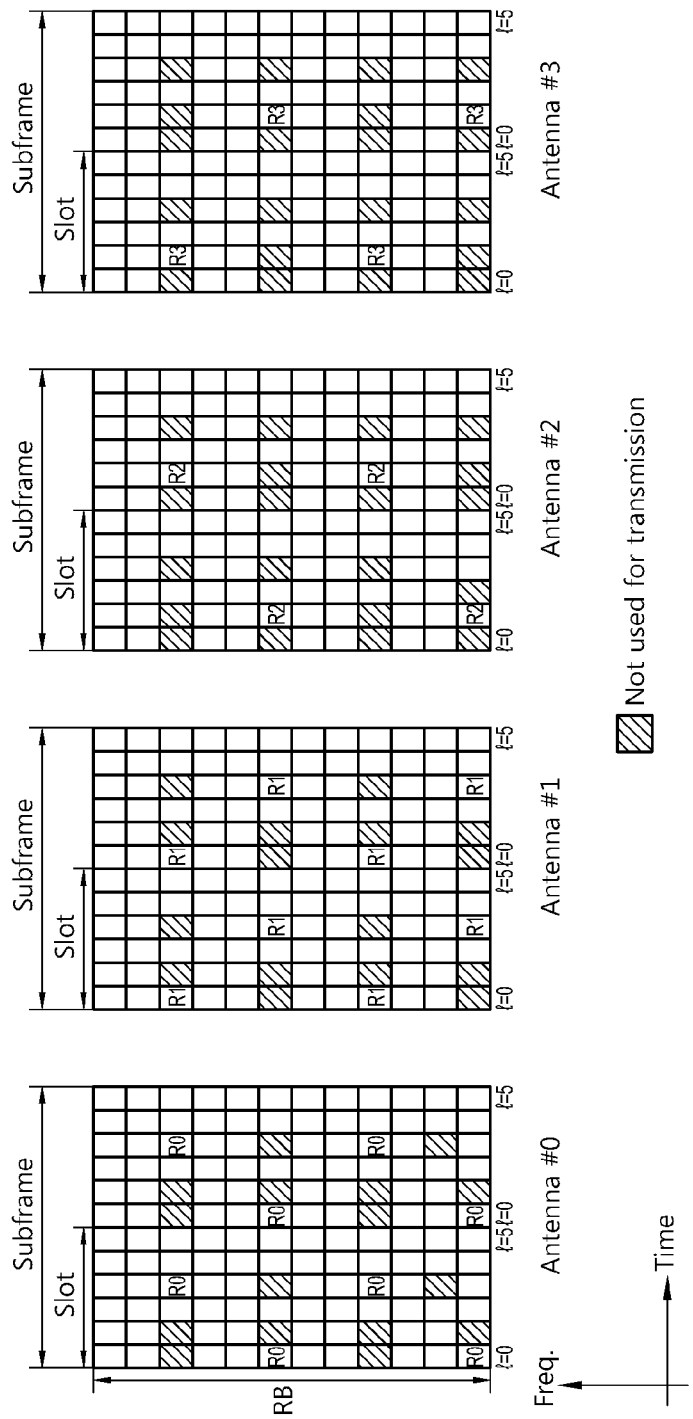
FIG. 10 is a diagram showing an example of mapping of common reference signals for four antennas in the case of the extended CP.

FIG. 5 shows an example of mapping of common reference signals for a single antenna in the case of a normal CP. FIG. 6 shows an example of mapping of common reference signals for two antennas in the case of the normal CP. FIG. 7 shows an example of mapping of common reference signals for four antennas in the case of the normal CP. FIG. 8 shows an example of mapping of a common reference signal for a single antenna in the case of an extended CP. FIG. 9 shows an example of mapping of common reference signals for two antennas in the case of the extended CP. FIG. 10 shows an example of mapping of common reference signals for four antennas in the case of the extended CP.

Referring to FIGS. 5 to 10, Rp represents the resource element used to transmit the reference signals through an antenna #p (p=0, 1, 2, 3). Hereinafter, the resource elements used to transmit the reference signals are referred to as a reference resource element. Rp is a reference resource element for the antenna #p. Rp is not used for any transmission through all the other antennas other than the antenna #p. In other words, the resource elements used to transmit the reference signals through any antenna within the subframe are not used for any transmission through other antennas within the same subframe and may be set to be 0. This is to remove the inter-antenna interference.

Hereinafter, for clarity, a minimum unit of the reference signal pattern (RS pattern) within the time-frequency resource is set as a basic unit. The reference signal pattern is a type in which the position of the reference resource element is determined within the time-frequency resource. When the basic unit extends to the time domain and/or the frequency domain, the reference signal pattern is repeated. In this case, the basic unit is a single subframe in the time domain and a single resource block in the frequency domain.

The common reference signals may be transmitted at each downlink subframe. A single common reference signal is transmitted to each antenna. The common reference signals correspond to a set of the reference resource elements within the subframe. The BS may transmit the common reference signals that are multiplied by the predetermined common reference sequences.

A reference signal pattern of the common reference signal is referred to as a common reference signal pattern. The common reference signal patterns for each antenna are orthogonal to each other in the time-frequency domain. The common reference signal patterns are common to all the UEs within the cell. The common reference sequence is also common to all the UEs within the cell. However, in order to minimize the inter-cell interference, each of the common reference signal patterns and the common reference signal sequences may be defined according to the cell.

The common reference signal sequences may be generated in the OFDM symbol unit within a single subframe. The common reference signal sequences may be varied according to a cell identifier (ID), the slot number within a single radio frame, the OFDM symbol index within the slot, the length of the CP, or the like.

In the OFDM symbol including the reference resource element within the basic unit, the number of reference resource elements for a single antenna is 2. That is, in the OFDM symbol including Rp within the basic unit, the number of Rps is 2. The subframe includes the N_DL resource block in the frequency domain. Therefore, in the OFDM symbol including Rp within the subframe, the number of Rps is 2×N_DL. Further, in the OFDM symbol including the Rp within the subframe, the length of the common reference signal sequence for the antenna #p is 2×N_DL.

The following equation represents an example of a complex sequence r (m) that is generated for the common reference signal sequence in a single OFDM symbol:

$$r(m) = \frac{1}{\sqrt{2}}(1 - 2 \cdot c(2m)) + j\frac{1}{\sqrt{2}}(1 - 2 \cdot c(2m+1)),$$ [Equation 1]

$$m = 0, 1, \ldots, 2N\_max, DL - 1$$

where N_max, DL is the number of resource blocks corresponding to the maximum downlink transmission bandwidth supported in the wireless communication system. In the LTE, N_max,DL is 110. When N_DL is smaller than N_max, DL, a predetermined portion having 2×N_DL among the complex sequences generated as 2×N_max, DL is selected, which may be used as the common reference signal sequences. c(i) is a PN sequence. The PN sequence may be defined by a gold sequence of a length-31. The following equation represents an example of c(i):

$$c(n) = (x(n+Nc) + y(n+Nc)) \mod 2$$

$$x(n+31) = (x(n+3) + x(n)) \mod 2$$

$$y(n+31) = (y(n+3) + y(n+2) + x(n+1) + x(n)) \mod 2$$ [Equation 2]

where Nc=1600, x (i) is a first m-sequence, and y (i) is a second m-sequence. For example, the first m-sequence may be initialized as x (0)=1, x (i)=0 (i=1, 2, . . . , 30) from the beginning of each OFDM symbol. The second m-sequence may be initialized according to the cell identifier (ID), the slot number within the radio frame, the OFDM symbol index within the slot, the length of the CP, or the like, from the beginning of each OFDM symbol.

The following equation is an example of the initialization of the second m-sequence:

$$\sum_{i=0}^{30} y(i) \cdot 2^i = 2^{10}(7(n\_s + 1) + l + 1)(2N\_cell\_ID + 1) +$$ [Equation 3]

$$2N\_cell\_ID + N\_CP$$

where n_s is the slot number within the radio frame, f is the OFDM symbol index within the slot, and N_cell_ID is the cell ID. In the case of the normal CP, the N_CP is 1 and in the case of the extended CP, N_CP is 0.

When the common reference signal sequences are generated according to the above Equation, the common reference signal sequences do not depend on the antenna. Therefore, when the common reference signals are transmitted to each of the plurality of antennas in the same OFDM symbol, the common reference signal sequences of each of the plurality of antennas are the same.

The common reference signal sequences generated for each OFDM symbol including the reference resource elements are mapped to the reference resource elements according to the common reference signal patterns. In this case, the common reference signal sequences may be mapped to the reference resource elements in an ascending order of the subcarrier index in order. In this case, the common reference signal sequences are generated for each antenna and the common reference signal sequences for each antenna are mapped to the reference resource elements.

Figure 11:
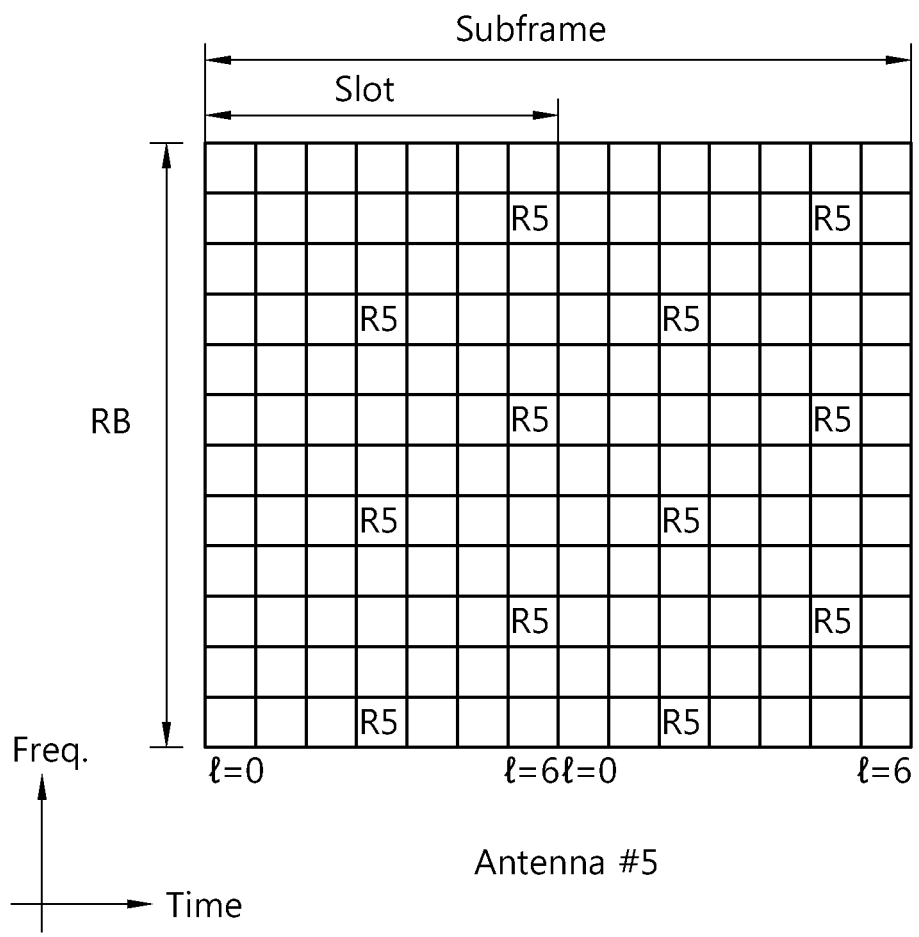
FIG. 11 is a diagram showing an example of mapping of dedicated reference signals in the case of the normal CP in the LTE.
Figure 12:
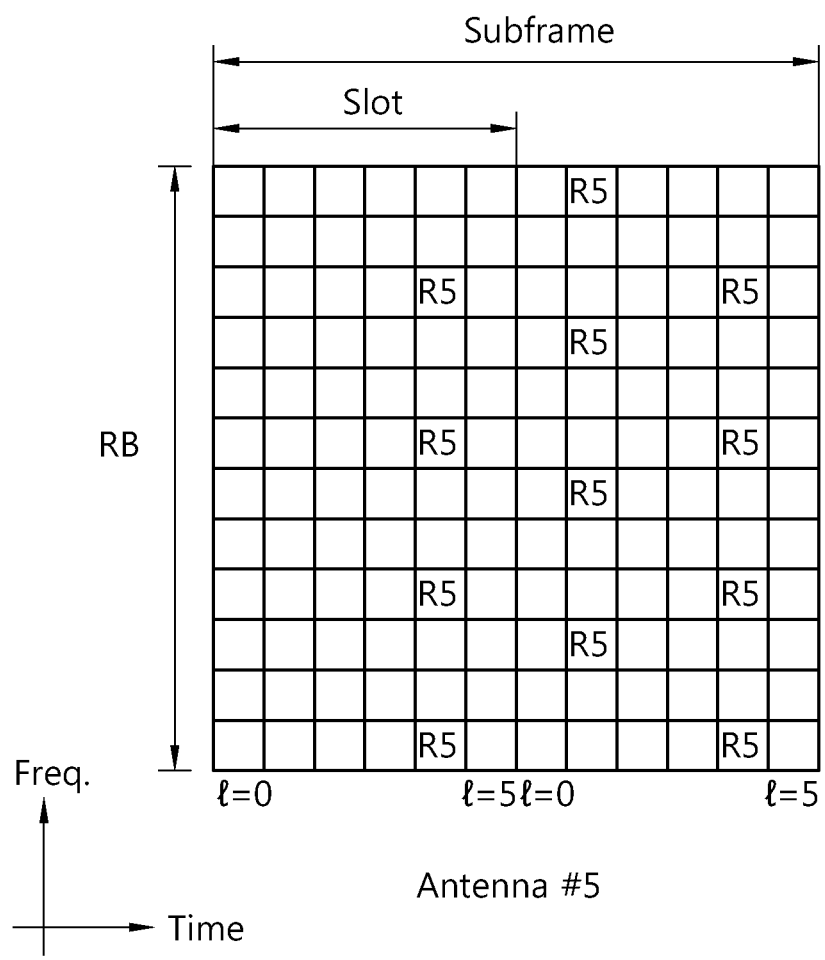
FIG. 12 is a diagram showing an example of mapping of dedicated reference signals in the case of the extended CP in the LTE.

FIG. 11 shows an example of mapping of dedicated reference signals in the case of the normal CP in the LTE. FIG. 12 shows an example of mapping of dedicated reference signals in the case of the extended CP in the LTE.

Referring to FIGS. 11 and 12, R5 represents the resource element used to transmit the dedicated reference signal through an antenna #5. In the LTE, the dedicated reference signal is supported for the single antenna transmission. The dedicated reference signals may be present and the PDSCH demodulation may be valid, when a transmission scheme for the downlink data on the PDSCH is set as a single antenna transmission via antenna #5 by the higher layer. The dedicated reference signals may be transmitted to the resource block to which the PDSCH is mapped. The dedicated reference signals correspond to a set of the reference resource elements within the resource block to which the PDSCH is mapped. The BS may transmit the common reference signal that is multiplied by the predetermined dedicated reference signal sequence. In this case, the basic unit is a single subframe in the time domain and a single resource block in the frequency domain.

The dedicated reference signals may be transmitted simultaneously with the common reference signals. Therefore, the reference signal overhead becomes much higher than the reference signal overhead when only the common reference signal is transmitted. The UE may use both of the common reference signals and the dedicated reference signals. The UE in the control region transmitting the control information in the subframe uses the common reference signals and the UE in the remaining data region in the subframe may use the dedicated reference signals. For example, the control region is the OFDM symbols in which the OFDM symbol index f within the first slot of the subframe is 0 to 2 (see FIG. 4).

The dedicated reference signal patterns that are the reference signal patterns of the dedicated reference signals may be common to all the UEs within the cell. However, in order to minimize the inter-cell interference, the dedicated reference signal patterns may be defined according to the cell. The dedicated reference signal sequences may be defined according to the UE. Therefore, the specific UE within the cell may receive the dedicated reference signals.

The dedicated reference signal sequences may be generated in the subframe unit. The dedicated reference signal sequences may be varied according to the cell ID, the position of the subframe within the single radio frame, the UE ID, or the like.

The number of reference resource elements for the dedicated reference signals within the basic unit is 12. That is, the number of R5 within the basic unit is 12. When the number of resource blocks to which the PDSCH is mapped is N_PDSCH, the total number of R5 for the dedicated reference signal is 12×N_PDSCH. Therefore, the length of the dedicated reference signal sequence is 12×N_PDSCH. The length of the dedicated reference signal sequence may be varied according to the number of resource blocks allocated to the UE for the PDSCH transmission.

The following equation represents an example of the dedicated reference signal sequence r(m):

$$r(m) = \frac{1}{\sqrt{2}}(1 - 2 \cdot c(2m)) + j\frac{1}{\sqrt{2}}(1 - 2 \cdot c(2m + 1)), \quad \text{[Equation 4]}$$
$$m = 0, 1, \ldots, 12 \times N\_PDSCH - 1$$

where c(i) is a PN sequence. c(i) may use the above Equation 2. In this case, the second m-sequence may be initialized according to the cell ID, the position of the subframe within the single radio frame, the UE ID, or the like, from the beginning of each subframe.

The following equation is an example of the initialization of the second m-sequence:

$$\sum_{i=0}^{30} y(i) \cdot 2^i = (\lfloor n\_s/2 \rfloor + 1) \cdot (2N\_cell\_ID + 1) \cdot 2^{16} + UE\_ID \quad \text{[Equation 5]}$$

where n_s is a slot number within the radio frame, N_cell_ID is the cell ID, and UE ID is the UE ID.

The dedicated reference signal sequences are mapped to the reference resource elements according to the reference signal patterns within the resource block to which the PDSCH is mapped. In this case, the dedicated reference signal sequences are mapped to the reference resource elements first in an ascending order of the subcarrier index and next in an ascending order of the OFDM symbol index within the resource block in order.

The structure of the common reference signals and the structure of the dedicated reference signals in the LTE system are described until now. The LTE system supports the 1, 2, or 4 antenna transmission in the downlink. That is, the UE (hereinafter, referred to as LTE UE) to which the LTE system is applied may receive signals transmitted through maximum four transmit antennas. The structure of the common reference signals in the LTE system is designed to perform the channel estimation of the maximum four transmit antennas.

The LTE-A system supports up to eight transmit antennas. That is, the UE (hereinafter, referred to as LTE-A UE) to which the LTE-A system is applied may receive signals transmitted through maximum eight transmit antennas. Therefore, the LTE-A system needs to transmit the reference signals so as to perform the channel estimation of the maximum eight transmit antennas.

However, the LTE UE and the LTE-A UE may coexist within the cell. Therefore, the LTE-A system needs to be designed to support the LTE UE and the LTE-A UE together. To this end, the LTE-A system may be designed to maintain backward compatibility with the LTE system.

In order to support the maximum eight antenna transmission in the LTE-A system, the LTE-A system needs to provide the reference signals for the maximum eight transmit antenna to the LTE-A UE. Further, the LTE-A system is configured to be shown as the system of the 1, 2 or 4 transmit antennas to the LTE UE in the downlink. Through this, the LTE-A system may support both of the LTE UE and the LTE-A UE. In this case, in the LTE-A system, the structure of the common reference signals in the LTE system may be maintained as maximally as possible.

In order to configure the system simultaneously supporting the LTE UE and the LTE-A UE, there is a need to provide the apparatus and method suitable for transmitting the reference signals. The LTE UE needs to appropriately design the structure of the reference signals that may be operated in the LTE-A system.

The control channel used for the LTE UE needs to be maintained by the MIMO scheme through the four transmit antennas so that the MIMO scheme through the four transmit antennas and the MIMO scheme through the eight transmit antennas are supported in the same subframe or the same radio frame. Therefore, the control region (see FIG. 4) within the downlink subframe may be configured to be operated as the two transmit antennas or the four transmit antennas that are supported in the LTE system.

As the method of implementing the 1, 2, or 4 antenna transmission for the LTE in the eight transmit antenna system, the following methods may be used.

First, for 8 transmit antenna system, a transmission scheme for 1, 2, or 4 antenna transmission for the LTE may be implemented by an on/off scheme. The 1, 2, or 4 antenna transmission may be implemented by turning-on/off 7, 6 or 4 transmit antennas among 8 transmit antennas as not to use the power. However, the scheme of turning-on/off the transmit antenna causes the loss of the transmission power.

Second, for 8 transmit antenna system, a transmission scheme for 1, 2, or 4 antenna transmission for the LTE may be implemented by a virtual antenna scheme. Since the scheme of turning-on/off the transmit antenna causes the loss of the transmission power, the virtual antenna scheme may be advantageous.

Hereinafter, the method and apparatus for transmitting the reference signals through the virtual antenna will be described. The contents described below may be applied to the LTE-A system and the general OFDM-MIMO system.

The UE to which a first system is applied and the UE to which a second system is applied may coexist within the cell. The second system is a system evolved from the first system. For example, the first system may be the LTE system and the second system may be the LTE-A system. As another example, the first system may be an IEEE 802.16e system and the second system may be an IEEE 802.16m system.

The second system is a system in which the number of transmit antennas supported in the downlink is more extended than the first system. The first system supports up to K transmit antennas in the downlink and the second system supports N transmit antennas in the downlink (N>K). For example, the first system may be the LTE system (K=4) and the second system may be the LTE-A system (N=8).

Figure 13:
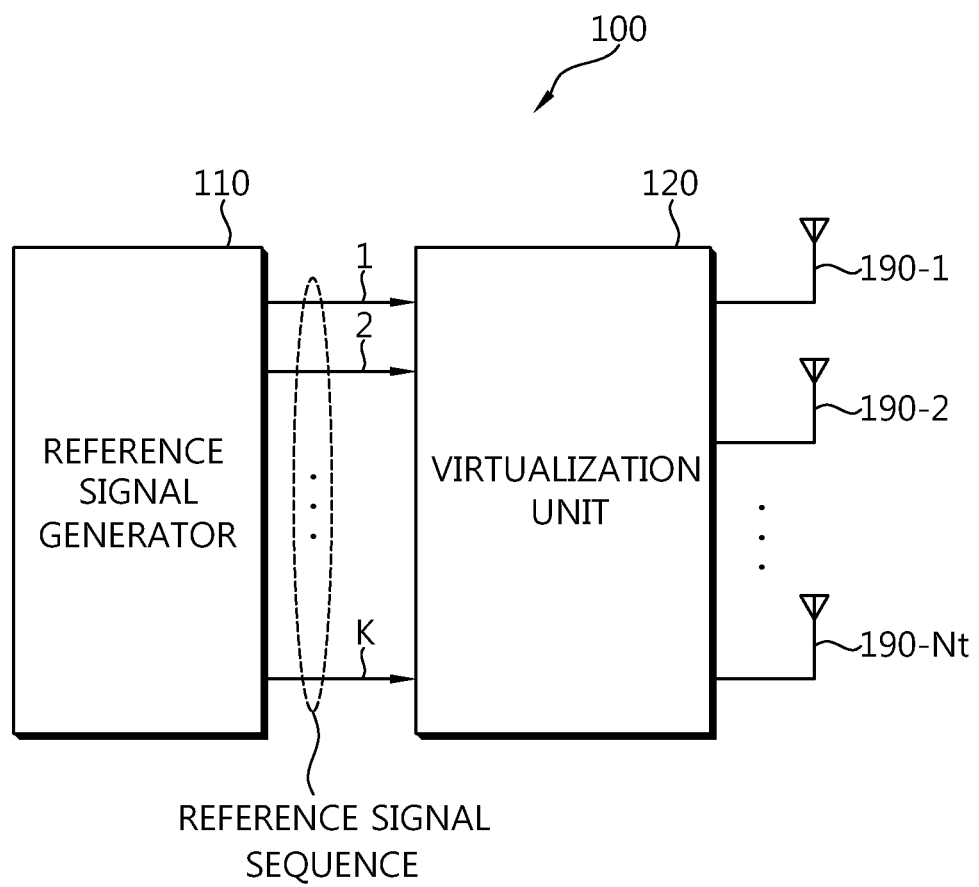
FIG. 13 is a block diagram showing an example of a transmitter structure using an antenna virtualization scheme.

FIG. 13 is a block diagram showing an example of a transmitter structure using an antenna virtualization method. In this configuration, the transmitter may be a part of the BS or the UE.

Referring to FIG. 13, a transmitter 100 includes a reference signal generator 110, a virtualization unit 120, and an Nt transmit antennas 190-1, . . . 190-Nt. The Nt transmit antennas 190-1, . . . , 190Nt are a physical antenna. The reference signal generator 110 is connected to the virtualization unit 120 and the virtualization unit 120 is connected to the Nt transmit antennas 190-1, . . . , 190Nt.

The reference signal generator 110 is configured to generate K reference signal sequences (K<Nt).

The virtualization unit 120 is configured to generate each of the K reference signal sequence vectors by mapping each of the K reference signal sequences to each of the K virtual antennas. The single reference signal sequence vector may be generated by mapping the single reference signal sequence to the single virtual antenna. Each of the K reference signal sequence vectors are transmitted through the Nt transmit antennas 190-1, . . . , 190-Nt.

As described above, the transmitter 100 including the Nt transmit antennas may transmit the reference signals through the K virtual antennas using the antenna virtualization. In the viewpoint of the UE, the reference signals are considered as being transmitted through the K antennas. For example, in the LTE-A system, the BS including the eight transmit antennas may transmit the reference signals through the 1, 2, or 4 virtual antennas using the antenna virtualization.

When the antenna transmission of K or less is supported, the reference signals may be transmitted in the virtual antenna mapping method. However, when the antenna transmission more than K is supported, the method for transmitting the reference signals is problematic. That is, the LTE UE supports the antenna transmission of four or less may transmit the reference signals in the virtual antenna mapping scheme. However, the method for transmitting the reference signals for the LTE-A UE supporting the antenna transmission more than four is problematic.

First, the reference signals for the LTE-A UE may be transmitted in the physical antenna mapping scheme. Second, the reference signals for the LTE-A UE may also be transmitted in the virtual antenna mapping scheme.

First, the case in which the reference signals for the LTE-A UE may be transmitted in the physical antenna mapping scheme will be described. In this case, only the reference signals for the LTE UE are transmitted in the virtual antenna mapping scheme and the reference signals for the LTE-A UE are transmitted in the physical antenna mapping scheme. Alternatively, when the K antenna transmission is performed regardless of the kind of the UE, the virtual antenna mapping scheme may be applied and when the antenna transmission more than K is performed, the physical antenna mapping scheme may be applied. For example, for the four transmit antenna MIMO scheme, it is configured to apply the virtual antenna mapping and for the eight transmit antenna MIMO scheme, it may be configured to apply the physical antenna mapping. In this case, the reference signals used for the four transmit antenna MIMO scheme may not be used for the eight transmit antenna MIMO scheme. Therefore, the reference signals for measurement for the eight transmit antenna MIMO schemes needs to be transmitted to the LTE-A UE, separately from the reference signals of the four transmit antenna MIMO scheme. In this case, the precoding of the eight transmit antenna MIMO scheme may be more accurately used.

Next, the case in which the reference signals for the LTE-A UE may also be transmitted in the virtual antenna mapping scheme will be described. In this case, the eight virtual antennas for the LTE-A UE are configured. The 1, 2, or 4 antennas are selected from the eight virtual antennas configured for the LTE UE.

Figure 14:
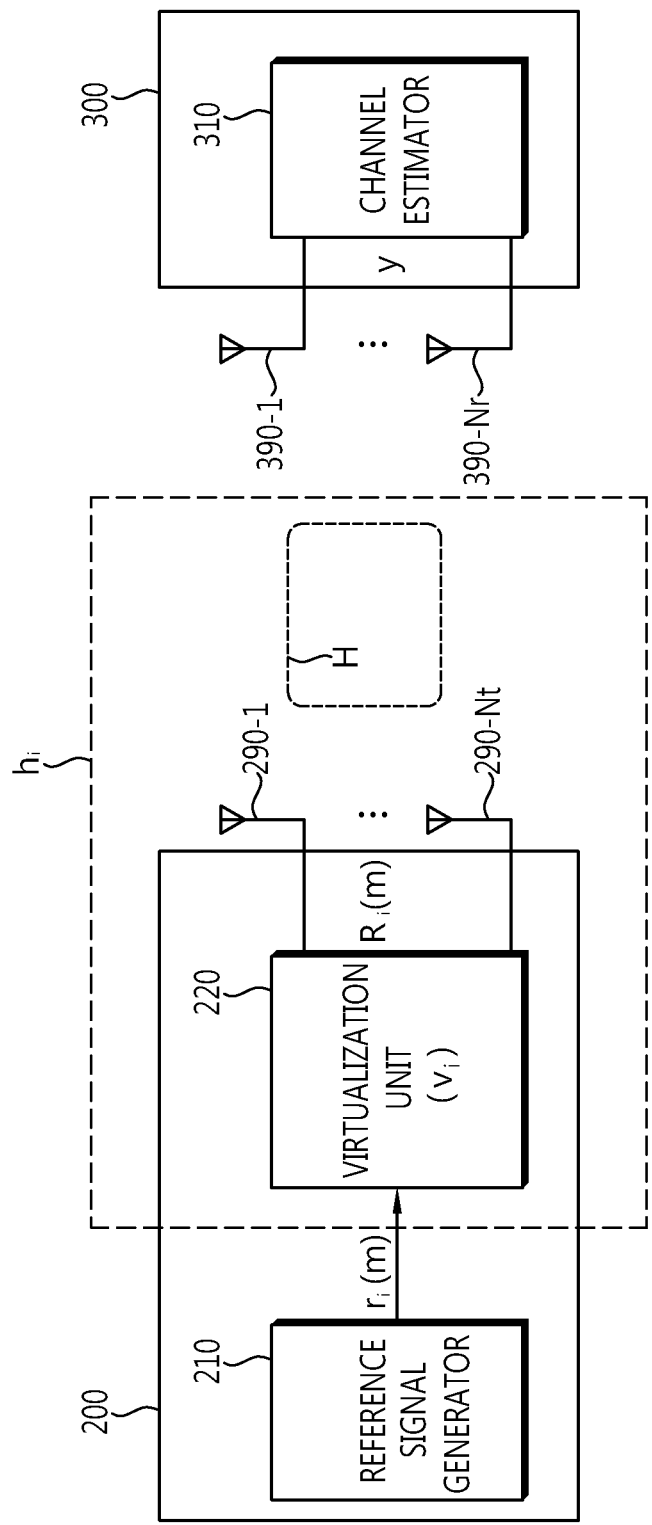
FIG. 14 is a block diagram showing an example of a wireless communication system for transmitting the reference signals through a single virtual antenna.

FIG. 14 shows a block diagram of an example of a wireless communication system for transmitting the reference signals through a single virtual antenna.

Referring to FIG. 14, a transmitter 200 includes a reference signal generator 210, a virtualization unit 220, and an Nt transmit antennas 290-1, . . . , 290-Nt (Nt is a natural number). The Nt transmit antenna 290-1, . . . , 290Nt are a physical antenna. The reference signal generator 210 is connected to the virtualization unit 220 and the virtualization unit 220 is connected to the Nt transmit antennas 290-1, . . . , 290Nt. The receiver 300 include a channel estimator 310 and Nr receive antennas 390-1, . . . , 390-Nr. The transmitter 200 may be a part of the BS and the receiver 300 may be a part of the UE.

A MIMO channel matrix H is formed between the Nt transmit antennas 290-1, . . . , 290-Nt and the Nr receive antennas 390-1, . . . , 390-Nr. The size of the MIMO channel matrix H is Nr×Nt. When the number of receive antennas is 1, the MIMO channel matrix becomes a row vector. Generally, the matrix conceptually includes a row vector and a column vector.

The reference signal generator 210 is configured to generate a reference signal sequence #i($r_i(m)$). The reference signal sequence #i($r_i(m)$) is a reference signal sequence #i($r_i(m)$) mapped according to pattern #i, where i is a pattern index indicating the reference signal pattern and m corresponds to the time-frequency resource index. The reference signal pattern is the time-frequency resource pattern used for the reference signal sequence transmission. For example, reference signal pattern #0 to reference signal pattern #3 may use the structure of the reference signal shown in FIG. 7.

Alternatively, the reference signal sequence #i($r_i(m)$) may be the reference signal sequence mapped according to the reference signal pattern for the transmit antenna #i (I=0, 1, . . . , Nt−1). In this case, different reference signal patterns may be used for each of the Nt transmit antenna.

The virtualization unit 220 is configured to map the reference signal sequence #i($r_i(m)$) to the virtual antenna #i. In order to map the reference signal sequence #i($r_i(m)$) to the virtual antenna #i to use the virtual antenna matrix V.

The number of virtual antenna matrices may be equal to the number of physical antennas and the number of rows in the virtual antenna matrix may be configured to be equal to the number of virtual antennas. When the reference signal for the LTE-A UE is also transmitted to the virtual antenna mapping scheme, the Nt virtual antennas may be configured. In this case, the size of the virtual antenna matrix is Nt×Nt.

The following equation represents an example of the virtual antenna matrix when Nt is 8:

$$V = (v_0 \ v_1 \ \cdots \ v_7) = \begin{pmatrix} v_{00} & v_{10} & \cdots & v_{70} \\ v_{01} & v_{11} & \cdots & v_{71} \\ \vdots & \vdots & \ddots & \vdots \\ v_{07} & v_{17} & \cdots & v_{77} \end{pmatrix} \quad \text{[Equation 6]}$$

where $v_i$ is an i-th column vector of the virtual antenna matrix to map the reference signal to the virtual antenna #i. $v_{ij}$ is a complex coefficient (i∈{0, 1, . . . , 7}, j∈{0, 1, . . . , 7}) of the virtual antenna matrix. The complex coefficient may be configured in various types in some cases.

The virtual antenna matrix may be configured in a unitary matrix type. When the virtual antenna matrix is a unitary matrix, power may be equally distributed to all the transmit antennas.

The reference signal sequence vector #i in which the reference signal sequence vector #i is mapped to the virtual antenna #i may be represented by the following equation:

$$R_i(m) = v_i \cdot r_i(m), i=0, \ldots, 7 \quad \text{[Equation 7]}$$

where $r_i(m)$ is the reference signal sequence #i, $v_i$ is the virtual antenna vector #i which is the i-th column vector of the virtual antenna matrix, and $R_i(m)$ is the reference signal sequence vector #i.

The transmitter 200 transmits the reference signal sequence vector #i($R_i(m)$) through the Nt transmit antennas 290-1, ..., 290-Nt.

The receiver 300 receives a receive signal vector $y = [y_1 \ y_2, \ldots, y_{Nr}]^T$ through the Nr receive antennas 390-1, ..., 390-Nr The receive signal vector y may be represented by the following equation:

$$y = H v_i r_i(m) + n \quad \text{[Equation 8]}$$
$$= h_i r_i(m) + n$$

where $n = [n_1 \ n_2, \ldots, n_{Nr}]^T$ is a noise vector.

The channel estimator 310 is configured to estimate the virtual antenna channel #i($h_i$) that is the virtual antenna channel of the virtual antenna #i from the receive signal vector. Since the channel estimator 310 knows the reference signal sequence #i($r_i(m)$), it may estimate the virtual antenna channel #i($h_i$).

Although the case of transmitting the single reference signal sequence through the single virtual antenna is described herein, the K reference signal sequence may be transmitted through the K virtual antenna. When the K antenna transmission is applied to the LTE UE, the BS may transmit the reference signals by configuring the Nt virtual antennas and selecting the K virtual antenna among the Nt virtual antennas.

The K reference signal sequence vectors are generated based on each of the K reference signals and sequences and each of the K virtual antenna vectors and each of the K reference signal sequence vectors may be transmitted through the Nt transmit antennas. In this case, each of the K virtual antenna vectors may be different column vectors selected from the virtual antenna matrix.

The virtual antenna matrix may use the same virtual antenna matrix, regardless of K. Alternatively, the virtual antenna matrix may be differently used according to K. For example, the BS may use the same virtual antenna matrix according to the 1, 2, or 4 antenna transmission for the LTE UE or may use other virtual antenna matrices.

Hereinafter, the detailed example of the virtual antenna matrix will be described.

1. When configuring eight virtual antennas and selecting four virtual antennas among the eight virtual antennas When applying four antenna transmission to the LTE UE, the BS may transmit the reference signals by configuring the eight virtual antennas and selecting the four virtual antennas among the eight virtual antennas. In this case, the following virtual antenna matrix may be configured.

The following equation is an example of the virtual antenna matrix.

$$V = (v_0 \ v_1 \ \ldots \ v_7) = \begin{pmatrix} 1 & 0 & 0 & 0 & 1 & 0 & 0 & 0 \\ 0 & 1 & 0 & 0 & 0 & 1 & 0 & 0 \\ 0 & 0 & 1 & 0 & 0 & 0 & 1 & 0 \\ 0 & 0 & 0 & 1 & 0 & 0 & 0 & 1 \\ 1 & 0 & 0 & 0 & -1 & 0 & 0 & 0 \\ 0 & 1 & 0 & 0 & 0 & -1 & 0 & 0 \\ 0 & 0 & 1 & 0 & 0 & 0 & -1 & 0 \\ 0 & 0 & 0 & 1 & 0 & 0 & 0 & -1 \end{pmatrix} \quad \text{[Equation 9]}$$

In this case, the virtual antenna vector is fixed regardless of the positions of the time-frequency resources. A specific beam is formed regardless of the time-frequency resources. In this case, the time-frequency resources may be the subcarrier, the resource elements, or the specific resources.

The following equation is another example of the virtual antenna matrix:

[Equation 10]

$$V = \begin{pmatrix} 1 & 0 & 0 & 0 & 1 & 0 & 0 & 0 \\ 0 & 1 & 0 & 0 & 0 & 1 & 0 & 0 \\ 0 & 0 & 1 & 0 & 0 & 0 & 1 & 0 \\ 0 & 0 & 0 & 1 & 0 & 0 & 0 & 1 \\ \exp(jd_1 k) & 0 & 0 & 0 & -\exp(jd_1 k) & 0 & 0 & 0 \\ 0 & \exp(jd_2 k) & 0 & 0 & 0 & -\exp(jd_2 k) & 0 & 0 \\ 0 & 0 & \exp(jd_3 k) & 0 & 0 & 0 & -\exp(jd_3 k) & 0 \\ 0 & 0 & 0 & \exp(jd_4 k) & 0 & 0 & 0 & -\exp(jd_4 k) \end{pmatrix}$$

where k is the time-frequency resource index indicating the time-frequency resources and $d_i$ is a phase ($0 \leq d_i < 2\pi$, i=1, 2, 3, 4). For example, k may be the subcarrier index, the resource element index, or the specific resource index. The beam may be formed according to the time-frequency resource.

Other types of any matrices may be used as the virtual antenna matrix. For example, the virtual antenna matrix may be configured by a combination of a phase diagonal matrix and a constant modulus matrix. The constant modulus matrix is a matrix where each element of the matrix has the same size other than '0'. For example, the constant modulus matrix U may be a discrete Fourier transform (DFT) matrix or a Walsh matrix. For example, the virtual antenna matrix may be represented by the following equation:

[Equation 11]

$$V = \begin{pmatrix} \exp(jd_0 k) & 0 & 0 & 0 & 0 & 0 & 0 & 0 \\ 0 & \exp(jd_1 k) & 0 & 0 & 0 & 0 & 0 & 0 \\ 0 & 0 & \exp(jd_2 k) & 0 & 0 & 0 & 0 & 0 \\ 0 & 0 & 0 & \exp(jd_3 k) & 0 & 0 & 0 & 0 \\ 0 & 0 & 0 & 0 & \exp(jd_4 k) & 0 & 0 & 0 \\ 0 & 0 & 0 & 0 & 0 & \exp(jd_5 k) & 0 & 0 \\ 0 & 0 & 0 & 0 & 0 & 0 & \exp(jd_6 k) & 0 \\ 0 & 0 & 0 & 0 & 0 & 0 & 0 & \exp(jd_7 k) \end{pmatrix} U$$

where the matrix U is the constant modulus matrix, k is the time-frequency resource index indicating the time-frequency resources, and $d_i$ is a phase ($0 \leq d_i < 2\pi$, i=0, 1, ..., 7). The constant modulus matrix U may be the unitary matrix in which the size of each element of the matrix is the same. k may be the subcarrier index, the resource element index, or the specific resource index.

When the phase $d_i$ is '0' (I=0, 1, ..., 7), the virtual antenna matrix V becomes U. The phase di may use the fixed value or may be determined by the BS (i=0, 1, ..., 7).

B. When configuring the eight virtual antennas and selecting the two virtual antennas among the eight virtual antennas When applying the two antenna transmission to the LTE UE, the BS may transmit the reference signals by configuring the eight virtual antennas and selecting the two virtual antennas among the eight virtual antennas. In this case, the following virtual antenna matrix may be configured.

The following equation is an example of the virtual antenna matrix.

$$V = (v_0 \quad v_1 \quad \ldots \quad v_7) \qquad [\text{Equation 12}]$$

$$= \begin{pmatrix} 1 & 0 & 1 & 0 & 1 & 0 & 1 & 0 \\ 0 & 1 & 0 & 1 & 0 & 1 & 0 & 1 \\ 1 & 0 & j & 0 & -1 & 0 & -j & 0 \\ 0 & 1 & 0 & j & 0 & -1 & 0 & -j \\ 1 & 0 & -1 & 0 & 1 & 0 & -1 & 0 \\ 0 & 1 & 0 & -1 & 0 & 1 & 0 & -1 \\ 1 & 0 & -j & 0 & -1 & 0 & j & 0 \\ 0 & 1 & 0 & -j & 0 & -1 & 0 & j \end{pmatrix}$$

The virtual antenna matrix may be configured by extending the DFT matrix or the Walsh matrix. For example, the virtual antenna matrix may be represented by the following equation:

$$V = (v_0 \quad v_1 \quad \ldots \quad v_7) = \begin{pmatrix} D_{4\times 4} & 0 \\ 0 & D_{4\times 4} \end{pmatrix} \qquad [\text{Equation 13}]$$

$$\text{or } \begin{pmatrix} W_{4\times 4} & 0 \\ 0 & W_{4\times 4} \end{pmatrix}$$

where $D_{4\times 4}$ is the DFT matrix of 4×4 size and $W_{4\times 4}$ is a Walsh matrix of 4×4 size. As described above, the virtual antenna matrix may be configured by extending the DFT matrix or the Walsh matrix in a block diagonal type.

The virtual antenna matrix may be configured in a row permutation type of a matrix according to the above Equation 13. This may be represented by the following equation:

$$V = (v_0 \quad v_1 \quad \ldots \quad v_7) = P_{8\times 8} \begin{pmatrix} D_{4\times 4} & 0 \\ 0 & D_{4\times 4} \end{pmatrix} \qquad [\text{Equation 14}]$$

$$\text{or } P_{8\times 8} \begin{pmatrix} W_{4\times 4} & 0 \\ 0 & W_{4\times 4} \end{pmatrix}$$

where $P_{8\times 8}$ is a permutation matrix with an 8×8 size. The permutation matrix is a matrix in which all the elements of a regular square matrix are 0 or 1 and each row or column include only a single 1.

The matrix in which each of the matrices according to the above equations 12 to 14 is combined with the phase diagonal matrix may be configured as the virtual antenna matrix.

As described above, the virtual antenna matrix may be differently configured according to the number of transmit antennas supporting the LTE UE. In addition, the virtual antenna matrix for the specific number (for example, 1, 2, or 4) of transmit antennas may be configured in at least one. In this case, other virtual antenna matrices may be used according to the conditions, such as the transmission scheme, the subframe, the radio frame, a relay node, or the like.

The transmission scheme may be a scheme through which the BS transmits the downlink data to the UE. An example of the transmission scheme may include a single antenna scheme, an MIMO scheme, or the like. An example of the MIMO scheme may include a transmission diversity scheme, an open-loop spatial multiplexing scheme, a closed-loop spatial multiplexing scheme, a multiple user-MIMO (MU-MIMO) scheme, or the like. The transmission scheme may be semi-statically set by higher layer signaling such as a radio resource control (RRC).

As described above, the transmitter including the Nt transmit antennas may transmit the reference signals through the K virtual antennas using the antenna virtualization. Through this, the reference signals may be transmitted to the LTE UE supporting the K antenna transmission.

However, when the reference signals for the LTE-A UE supporting the Nt antenna transmission are also transmitted in the virtual antenna mapping manner, the reference signals also need to be transmitted through the remaining Nt-K virtual antennas. The following method may be used.

1. Virtual Antenna Reconfiguration

In the configuration of the virtual antenna, the channel characteristics are determined by the virtual antenna vector #i($v_i$). Therefore, when the virtual antenna vector #i($v_i$) is differently configured, the reference signals may be transmitted through other virtual antennas.

The reference signal sequence vector #j may be configured by the following equation:

$$R_j(m) = v_i \cdot r_j(m), i \in \{0, \ldots, 7\}, j \in \{0, \ldots, 7\} \qquad [\text{Equation 15}]$$

where $r_j(m)$ is the reference signal sequence #j, $v_i$ is the virtual antenna vector #i which is the i-th column vector of the virtual antenna matrix, and $R_j(m)$ is the reference signal sequence vector #j. That is, the reference signal sequence vector #j corresponds to one in which the reference signal sequence #j is mapped to the virtual antenna #i. i is the virtual antenna index and j is the pattern index indicating the reference signal pattern. The values of the virtual antenna index i and the pattern index j are applied differently for a predetermined time period, which may be informed to the LTE-A UE. Through this, the LTE-A UE may be configured to obtain all the eight virtual antenna channel information.

For example, it is assumed that the LTE UE selects the four virtual antennas among the eight virtual antennas and uses the four virtual antennas. The LTE UE may uses other virtual antennas over time, rather than using the same four virtual antennas at all times. In this case, the LTE UE may detect only the change in the channel and differentiate whether the signals are transmitted from other virtual antennas. However, the LTE-A UE may know the change in the four virtual antennas and thus, may additionally obtain the information on the remaining four virtual antennas. All the virtual antenna vectors may be transparently implemented in all the LTE-A UEs.

For example, it is assumed that the reference signal sequence #0 is transmitted through the virtual antenna #0 in a first period (($R_0(m)=v_0r_0(m)$)) In this case, the LTE-A UE may obtain the information on the virtual antenna channel #0 ($h_0=Hv_0$). It is assumed that the reference signal sequence #0 is transmitted through the virtual antenna #3 in the second period (($R_0(m)=v_3r_0(m)$)) In this case, the LTE-A UE may obtain the information on the virtual antenna channel #3 ($h_3=Hv_3$). For example, the first period and the second period may each be different subframes or different radio frames. As a result, the LTE-A UE may obtain the information on different virtual antenna channels through the reference signal sequences transmitted at all the same time-frequency positions in the first period and the second period. The reference signal sequences transmitted at the same time-frequency positions may be referred to as the reference signal sequences using the same reference signal patterns.

2. Virtual Antenna Group Swapping

The Nt virtual antennas may be defined as two virtual antenna groups such as the first virtual antenna group including a K virtual antennas and a second virtual antenna group including the Nt-K virtual antennas. For example, Nt may be 8 and K may be 4. The first virtual antenna group G1 and the second virtual antenna group G2 may exchange different virtual antenna vectors in the first period t1 and the second period t2. In this case, Nt virtual antenna channels generated by all virtual antenna vectors may be configured to be obtained at the fixed reference signal sequence positions.

For example, the first virtual antenna group G1 and the second virtual antenna group G2 in the first period t1 are represented by the following equation.

$$G1=\{v_0r_0(m),v_1r_1(m),v_2r_2(m),v_3r_3(m),\}$$

$$G2=\{v_4r_4(m),v_5r_5(m),v_6r_6(m),v_7r_7(m),\}$$ [Equation 16]

The first virtual antenna group G1 and the second virtual antenna group G2 in the first period t1 may be exchanged like the following equation in the second period t2.

$$G1=\{v_4r_0(m),v_5r_1(m),v_6r_2(m),v_7r_3(m),\}$$

$$G2=\{v_0r_4(m),v_1r_5(m),v_2r_6(m),v_3r_7(m),\}$$ [Equation 17]

The exchange of the virtual antenna groups may happen only in the measurement common reference signal (measurement common RS) transmission period. The virtual antenna vector of the first virtual antenna group G1 and the virtual antenna vector of the second virtual antenna group G2 may be instantly exchanged and transmitted, in only the subframe in which the measurement reference signals need to be transmitted.

All the virtual antenna vectors may be explicitly implemented in the LTE-A UE. For example, the LTE-A UE receives the channel information on the virtual antennas #0 to #3 or the virtual antennas #4 to #7 through the reference signal sequences #0 to #3. In the period in which the virtual antenna groups are exchanged, the LTE-A UE may receive the channel information on the remaining virtual antennas. The period in which the virtual antenna groups are exchanged may be the subframe.

3. Virtual Antenna Selection

The BS optionally selects the K virtual antennas among the Nt virtual antennas to inform the information on the K virtual antennas, the virtual antenna information to the LTE-A UE. In this case, the K virtual antenna may be changed over time. The virtual antenna information on the K virtual antennas selected may be transmitted for each predetermined period. Alternatively, the patterns selected by the K virtual antennas among the Nt virtual antennas may be previously defined.

4. Measurement RS Transmission Method

The measurement reference signals for the NT transmit antenna MIMO scheme may be transmitted by using the above-mentioned virtual antenna resetting, the virtual antenna exchange, the virtual antenna selection, or the like.

For example, it is assumed that the reference signal patterns of the measurement reference signals transmit only $\{r_0(m), r_1(m), r_2(m), r_3(m)\}$ in the LTE-A system. In this case, the measurement reference signals for the eight transmit antenna MIMO scheme may be transmitted only by the reference signal patterns of FIG. 7. For the eight transmit antenna MIMO scheme, the LTE-A UE needs to know all the eight virtual antenna channels.

Other virtual antenna vectors are multiplied and transmitted over time by the above-mentioned three methods, or the like, such that the LTE-A UE may be configured to obtain all the virtual antenna channel information after time elapses.

The period in which the virtual antenna vectors are changed may be configured to be changed according to a channel quality indicator (CQI), a precoding matrix index (PMI), and/or a rank indicator (RI) feedback period. The CQI may indicate an MCS level suitable for the channel. Alternatively, the CQI may be the quantization information of the channel or the quantization information of the effective channel. The PMI indicates a codebook index suitable for the channels. The RI indicates the rank of the channels. For example, the virtual antenna vector may be changed according to the information on the earliest feedback period among the feedback periods of the CQI, PMI, and RI.

For example, it is assumed that the information on the earliest feedback period is the CQI and the feedback period of the CQI is 5 ms. The virtual antennas may be changed for each 5 ms period. For example, $G1\_v(1)=\{v_0r_0(m), v_1r_1(m), v_2r_2(m), v_3r_3(m)\}$ and $G2\_v(2)=\{v_4r_0(m), v_5r_1(m), v_6r_2(m), v_7r_3(m)\}$ are transmitted for each 5 ms period. The LTE-A UE may receive all the eight virtual antenna channels within a period. The LTE UE detects only the change in the time channel and thus, the operation thereof does not cause any problem.

Alternatively, the $G1\_v(1)$ may continuously be transmitted and then, temporally the $G2\_V(2)$ may be transmitted only in the subframe corresponding to the feedback period. Alternatively, the $G1\_v(1)$ may be continuously transmitted and then, temporally the G2_V(2) may be transmitted only in the specific subframe. Alternatively, the G1_v(1) may be continuously transmitted and then, temporally the G2_V(2) may be transmitted only in the specific frequency region.

When the above-mentioned virtual antenna resetting method or the virtual antenna exchange method are used, they may be used while setting and changing at least two G1_v(t).

All the virtual antenna vectors may be transparently implemented in the LTE-A UE. Therefore, the reference signal sequence vector #i($R_i$(m)) may be configured to be visible as the reference signals of the transmit antenna #i in the LTE-A UE (i=0, 1, . . . , 7).

5. Channel State Information Feedback

The LTE-A UE using the Nt virtual antennas obtain the virtual antenna channel information at the time of estimating the channels using the reference signals.

When the virtual antennas are used, the channel state information feedback of the LTE-A UE is problematic. When the virtual antenna channel information is reported, the performance of the specific MIMO scheme may be deteriorated. Therefore, there may be the case in which the physical antenna channel information is used in some cases. In this case, the physical antenna channel information may be obtained using the virtual antenna matrix V. The physical antenna channel state information may be estimated by reversely multiplying $V^H$ by the estimated channel matrix.

The LTE-A UE may estimate and feedback (1) the virtual antenna channel state information or (2) estimate and feedback the physical antenna channel state information.

The feedback method may be configured by one of the two methods and each of the two methods may be applied according to the multiple antenna transmission scheme.

The physical antenna channel information or the virtual antenna channel information may be feedback according to the transmission scheme. The channel information may be the CQI, the PMI, or the like.

Figure 15:
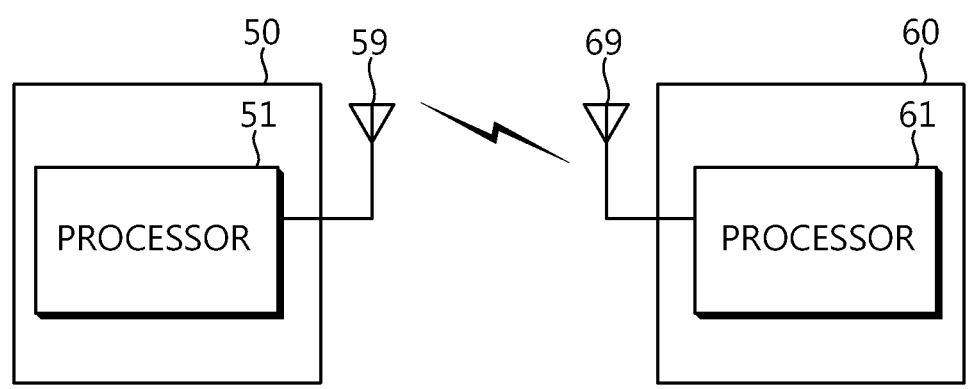
FIG. 15 is a block diagram showing an apparatus for wireless communication according to an exemplary embodiment of the present invention.

FIG. 15 is a block diagram showing an apparatus for wireless communication according to an exemplary embodiment of the present invention. The BS 50 includes a processor 51 and an antenna 59.

The processor 51 is connected to the antenna 59 to implement the proposed functions, processes, and/or methods. The layers of the protocol stack may be implemented by the processor 51. The antenna 59 transmits or receives the signals. The antenna 59 may be one or plural. The BS 50 may further include a memory (not shown). The memory (not shown) is connected to the processor 51 to store various pieces of information for driving the processor 51.

The UE 60 includes a processor 61 and an antenna 69. The processor 61 is connected to the antenna 69 to implement the proposed functions, processes, and/or methods. The layers of the radio interface protocol may be implemented by the processor 61. The antenna 69 transmits the transmit signals or receives the receive signals. The antenna 69 may be one or plural. The UE 60 may further include a memory (not shown). The memory (not shown) is connected to the processor 61 to store various pieces of information for driving the processor 61.

The processors 51 and 61 may include an application-specific integrated circuit (ASIC), other chipsets, a logical circuit, a data processing apparatus and/or a radio frequency (RF) unit that mutually converts the baseband signals and the radio signals. The proposed transmitter may be implemented in the processors 51 and 61. The memory (not shown) may include a read-only memory (ROM), a random access memory (RAM), a flash memory, a memory card, a storage medium, and/or other storage devices. When the exemplary embodiment is implemented by software, the above-mentioned method may be implemented by the module (process, function, or the like) that performs the above-mentioned function. The module is stored in the memory (not shown) and may be performed by the processors 51 and 61. The memory (not shown) may be in or out of the processors 51 and 61 and may be connected to the processors 51 and 61 by a widely known various units.

As described above, the exemplary embodiment of the present invention can provide the apparatus and method for efficiently transmitting the reference signals in the radio communication system. When the reference signals are transmitted by the virtual antenna mapping scheme, the reference signal overhead may be minimized. Further, the first UE supporting the maximum K antenna transmission and the second UE supporting the maximum Nt antenna transmission may be simultaneously supported (Nt>K). For example, the four transmission antenna MIMO scheme and the eight transmission antenna MIMO scheme may be simultaneously supported. As a result, since the LTE-A system maintains the backward compatibility with the LTE system, the LTE-A system may smoothly provide the communication services to both of the user using the LTE-A UE and the user using the LTE UE. Therefore, the overall system performance may be improved.

Those skilled in the art may easily understand additional advantages, objects, and characteristics of the present invention by the above-mentioned description or by carrying out the present invention based on the above-mentioned description. The present invention may also have unexpected advantages by being carried out by those skilled in the art based on the above-mentioned description.

In the above-mentioned exemplary system, methods have been described based on a flowchart as a series of steps or blocks. However, the present invention is not limited to the sequence of steps. That is, any step may be performed in a step and a sequence different from the above-mentioned step and sequence or several steps may be simultaneously performed. In addition, it may be appreciated by those skilled in the art that the steps shown in the flowchart are not exclusive and other steps may be added to the flowchart or at least one step may be deleted from the flowchart without departing from the scope of the present invention.

The exemplary embodiments of the present invention include various aspects of examples. Although all possible combinations for showing various aspects may not be described, those skilled in the art may appreciate that other combinations are possible. For example, those skilled in the art may use each configuration described in the above-mentioned embodiments in a scheme in that they are combined with each other. Therefore, the present invention is not limited to the embodiments of the present invention but provides the broadest scope matching with the principles disclosed herein and new characteristics.

The invention claimed is:

1. An apparatus for transmitting a reference signal, the apparatus comprising:
   N antennas; and
   a processor operatively coupled with the N antennas and configured to:
      generate K reference signal sequence vectors based on K reference signal sequences and K virtual antenna vectors, wherein K<N;
      transmit the K reference signal sequence vectors through the N antennas, wherein the K reference signal sequence vectors are transmitted during a first period;

generate N-K reference signal sequence vectors based on N-K reference signal sequences and N-K virtual antenna vectors; and transmit the N-K reference signal sequence vectors through the N antennas during a second period.

2. The apparatus of claim 1, wherein the K virtual antenna vectors and the N-K virtual antenna vectors are different column vectors selected from a virtual antenna matrix having N×N size.

3. The apparatus of claim 2, wherein a reference signal pattern for at least one reference signal sequence of the K reference signal sequences is the same as a reference signal pattern for at least one reference signal sequence of the N-K reference signal sequences, and the reference signal pattern is a time-frequency resource pattern used to transmit a reference signal sequence.

4. The apparatus of claim 2, wherein each virtual antenna matrix is a unitary matrix.

5. The apparatus of claim 1, wherein the processor is configured to receive virtual antenna channel information from a user equipment.

6. The apparatus of claim 2, wherein the processor is configured to receive physical antenna channel information from a user equipment, and the physical antenna channel information is estimated based on virtual antenna channel and the virtual antenna matrix.

7. An apparatus for transmitting a reference signal, the apparatus comprising:

N antennas; and a processor operatively coupled with the N antennas and configured to:

generate K reference signal sequence vectors based on K reference signal sequences and K virtual antenna vectors, wherein K<N;

transmit the K reference signal sequence vectors through the N antennas, wherein the K reference signal sequence vectors are transmitted in a first frequency domain, and the processor is configured to:

generate N-K reference signal sequence vectors based on N-K reference signal sequences and the N-K virtual antenna vectors; and transmit the N-K reference signal sequence vectors through the N antennas in a second frequency domain.

8. A method for transmitting a reference signal in a wireless communication system, the method comprising:

generating K reference signal sequence vectors based on K reference signal sequences and K virtual antenna vectors, wherein K<N;

transmitting the K reference signal sequence vectors through N antennas, wherein the K reference signal sequence vectors are transmitted during a first period;

generating N-K reference signal sequence vectors based on N-K reference signal sequences and N-K virtual antenna vectors; and transmitting the N-K reference signal sequence vectors through the N antennas during a second period.

* * * * *